United States Patent [19]

Kimura et al.

[11] 4,427,189
[45] Jan. 24, 1984

[54] SHOCK ABSORBING ASSEMBLY

[75] Inventors: Toshimitsu Kimura, Fujisawa; Yutaka Ohmura, Zushi, both of Japan

[73] Assignee: Nissan Motor Co., Ltd., Yokohama, Japan

[21] Appl. No.: 405,628

[22] Filed: Aug. 5, 1982

Related U.S. Application Data

[63] Continuation of Ser. No. 155,024, Jun. 2, 1980, abandoned.

[30] Foreign Application Priority Data

Jun. 4, 1979 [JP] Japan .................................. 54-70452

[51] Int. Cl.³ ............................................... F16F 1/37
[52] U.S. Cl. ..................................... 267/139; 293/136
[58] Field of Search ................ 188/376, 377; 267/109, 267/133, 139, 140; 293/109, 110, 121, 132, 133, 136, 146

[56] References Cited

U.S. PATENT DOCUMENTS

| | | | |
|---|---|---|---|
| 3,666,310 | 5/1972 | Burgess et al. | |
| 3,734,557 | 5/1973 | McKenzie | 188/1 C X |
| 3,876,082 | 4/1975 | Fehl et al. | 293/136 X |
| 3,979,110 | 9/1976 | Newton | 293/136 X |
| 4,072,334 | 2/1978 | Seegmiller et al. | |
| 4,082,338 | 4/1978 | Hutai et al. | 293/136 |
| 4,109,951 | 8/1978 | Weller | 293/109 X |
| 4,139,187 | 2/1978 | Hanusa | |

FOREIGN PATENT DOCUMENTS

| | | |
|---|---|---|
| 2234159 | 1/1973 | France . |
| 2166583 | 8/1973 | France . |
| 2272307 | 12/1975 | France . |
| 2414679 | 8/1979 | France . |

*Primary Examiner*—Duane A. Reger
*Attorney, Agent, or Firm*—James Creighton Wray

[57] ABSTRACT

A shock absorbing assembly disclosed such as an over rider of a bumper, a shock absorbing bumper, a stopper or a guard molding, comprises a core member or members molded of a low density elastomeric material having stud bolts or nuts inserted before molding and embedded therein, and a cover member molded of a high density elastomeric material enclosing the core member inserted before molding the cover member.

1 Claim, 8 Drawing Figures

SHOCK ABSORBING ASSEMBLY

This application is a continuation of application Ser. No. 155,024, filed June 2, 1980, now abandoned.

BACKGROUND OF THE INVENTION

1. Field of the Invention

The present invention relates to a shock absorbing assembly such as an over rider of a bumper, a bumper guard, a body side molding, a stopper or the like.

2. Description of the Prior Art

A shock absorbing assembly of this kind hitherto used, for example, a bumper guard comprises, as shown in FIG. 1, a main body 1 of a unitary shock absorbing member of an elastomeric high molecular compound and mounting stud bolts 2 embedded therein which are inserted in the bottoms of the main body when it is molded. The main body 1 includes a cavity 3 except the embedded portions 1a for the stud bolts 2, which are connected by a thin connection portion 1b. With this arrangement, the bumper guard is secured to a bumper 5 shown in phantom lines by means of the stud bolts 2 and nuts 4.

With this construction, however, there are following various disadvantages because the embedded portions 1a are unavoidably solid over from outer surfaces to the mounting bottoms.

(1) The material of the main body of the bumper guard is bulky which is disadvantageous in weight and cost.
(2) The difference in thickness between the thick embedded portions 1a and thin connection portion 1b causes a difference in cooling temperature between them when molding, resulting in shrinkage cavities on outer surfaces of the embedded portions 1a.
(3) The bulky main body requires a long period of time for the molding cycle.
(4) A range of hardness of the material of the main body to be adjusted for obtaining a required load characteristic is limited for the purpose of preventing surface defects of the main body.
(5) A hollow center portion for the purpose of avoiding an extra thickness is apt to be reversely tapered, so that a construction of the mold is complicated.

SUMMARY OF THE INVENTION

It is a principal object of the invention to provide an improved shock absorbing assembly which eliminates all the disadvantages of the prior art.

In order to accomplish this object, the shock absorbing assembly according to the invention comprises at least one core member molded of a low density elastomeric material including fastening means for mounting the assembly such as stud bolts, nuts or the like inserted before molding and embedded therein, and a cover member molded of a high density elastomeric material enclosing therein said core member inserted before molding said cover member.

In order that the invention may be more clearly understood, preferred embodiments will be described, by way of example, with reference to the accompanying drawings.

DETAILED DESCRIPTION OF THE PREFERRED EMBODIMENT

Figure 1:
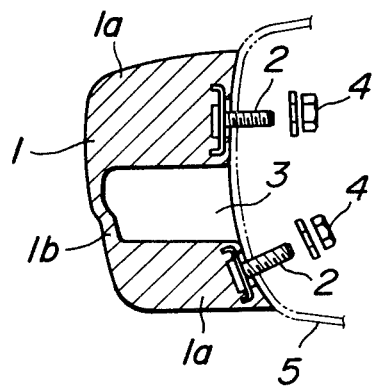
FIG. 1 is a sectional view of a shock absorbing assembly of the prior art as mentioned above.
Figure 2:
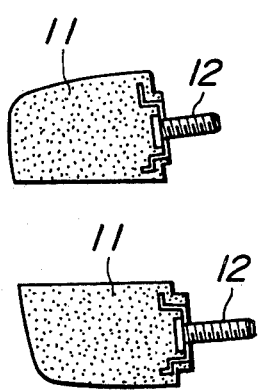
FIG. 2 is a sectional view of core members of parts of a shock absorbing assembly according to the invention.
Figure 3:
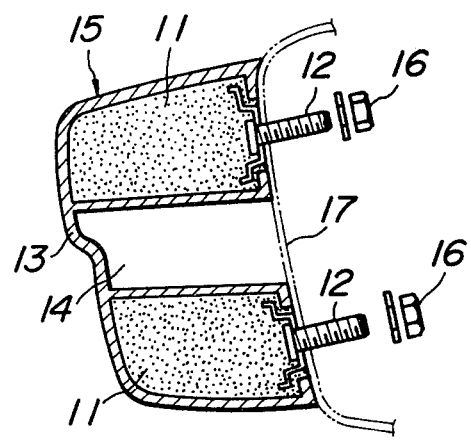
FIG. 3 is a sectional view wholly showing one embodiment of the shock absorbing assembly according to the invention.
Figure 4:
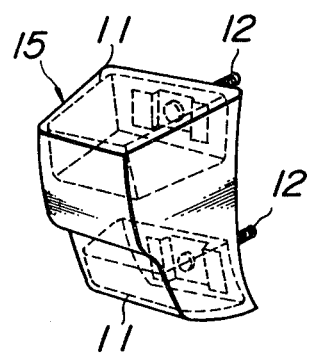
FIG. 4 is a perspective view wholly showing the assembly shown in FIG. 3.

FIG. 2 illustrates core members 11 of a low density foam elastomeric material such as uretane foam previously molded having at their bottoms respective mounting stud bolts whose heads are embedded therein. As shown in FIG. 3, the core members 11 are inserted into a mold in which a cover member 13 of a high density elastomeric high molecular compound such as RIM urethane is then molded so as to enclose the core members 11 to obtain an over rider including a space 14 between the cover member 13 and core members 11, whose external appearance is substantially the same as that of the main body 1 of the bumper guard of the prior art (FIG. 4).

The energy absorbing characteristic of the core members 11 can be controlled at will by changing the foaming amount and configuration of the core members. The cover member 13 is preferably formed so as to be uniform in thickness particularly taking care of strength, surface hardness, appearance and quality. The over rider thus obtained is clamped to a bumper 17 shown in phantom lines in FIG. 3 by means of nuts 16.

Figure 5:
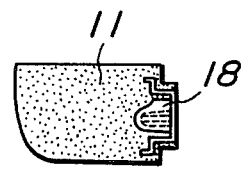
FIG. 5 is a sectional view showing another embodiment of the core member of the assembly according to the invention.

Instead of the stud bolt 12, a box nut 18 may be embedded in the core member 11 as shown in FIG. 5.

Figure 6:
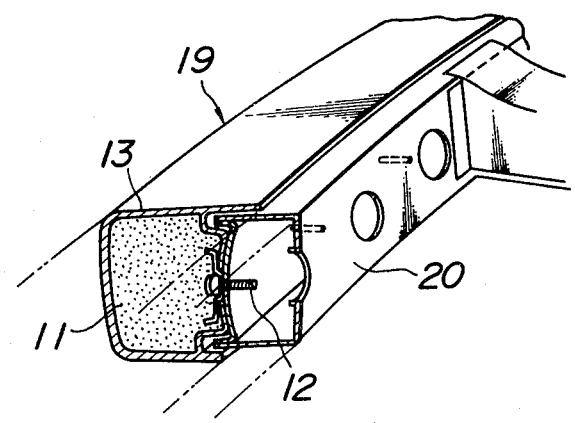
FIG. 6 is a partial sectional perspective view showing other embodiment wherein the present invention is applied to a shock absorbing bumper.

FIG. 6 illustrates other embodiment wherein the present invention is applied to a shock absorbing bumper 19. In this case, a unitary core member 11 is covered by a cover member 13 without including a space 14. This shock absorbing assembly as a bumper is secured to a back bar 20 by means of embedded bolts 12 for mounting the bumper to a vehicle body.

Figure 7:
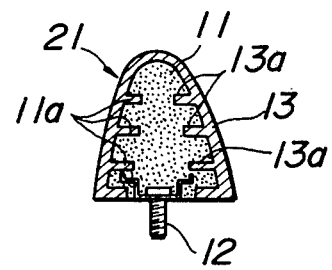
FIG. 7 is a partial sectional view showing one embodiment wherein the present invention is applied to a stopper.

FIG. 7 illustrates a further embodiment wherein the present invention is applied to a stopper 21. A unitary core member 11 is covered by a cover member 13 without a space 14 in the similar manner to FIG. 6. In this embodiment, the core member 11 is formed with a number of anchoring grooves 11a, while the cover member 13 is internally formed with a number of ridges 13a engaging the anchoring grooves 11a of the cover member 11.

Figure 8:
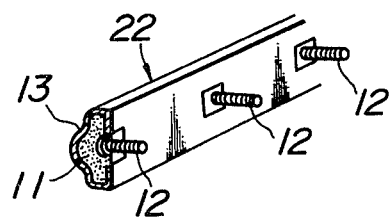
FIG. 8 is a partial sectional perspective view of further embodiment wherein the present invention is applied to a guard molding (or bumper guard).

FIG. 8 illustrates a further embodiment, wherein the present invention is applied to a guard molding (or bumper guard) 22. A unitary core member 11 is covered by a cover member 13 without a space 14 as the above embodiments.

In any of the embodiments above described, after the core members have been molded, it is only required for integrally forming the core and cover members to arrange the molded core in a mold when the cover member is molded.

As can be seen from the above description, the shock absorbing assembly according to the invention comprises a core member or members molded of a low density elastomeric foam having fastening means such as mounting stud bolts or nuts inserted before molding and embedded therein, and a cover member molded of an elastomeric high molecular compound enclosing the core member or members inserted before molding and embedded therein, thereby achieving the following advantages.

(1) The most part of the shock absorbing assembly is composed of a foam material to lighten the entire weight.

(2) The energy absorbing characteristic of the shock absorbing assembly can be effectively determined because the hardness of the core member can be widely adjusted by selecting the foaming extent and configuration of the core member 11.

(3) The cover member 13 can be formed substantially uniformly in thickness, so that there is no shrinkage cavity on its surface to provide a much more aesthetical appearance and a high quality.

(4) The core members 11 are inserted in portions to be hollow, so that the mold does not have inverse tapered portions and therefore the construction of the mold is simplified.

(5) The cover member 13 is thin and uniform in thickness which shorten the time required for curing the cover member and hence the molding cycle, thereby improving the productivity and reducing the cost.

(6) The mounting stud bolts or nuts embedded in the core members 11 molded of the low density elastomeric foam can easily be aligned even if their directions are not in desired directions. The mounting operation can easily be effected.

It is further understood by those skilled in the art that the foregoing description is preferred embodiments of the disclosed assembly and that various changes and modifications may be made in the invention without departing from the spirit and scope thereof.

What is claimed is:

1. A shock absorbing assembly comprising a core member having a sidewall extending longitudinally between proximal and distal ends and being molded of a low density elastomeric material, fastening means for mounting the assembly such as a stud bolt, nut or the like inserted before molding and embedded in the proximal end of said core member, said core member being formed with a plurality of longitudinally spaced annular anchoring grooves extending substantially inwardly and positioned on said sidewall between the proximal and distal ends, and a cover member molded of a high density elastomeric material enclosing therein said core member inserted before molding said cover member, the inner surfaces of said cover member overlying the sidewall of the core being formed with a plurality of similarly longitudinally spaced ridges engaging the anchoring grooves of said core member, said ridges extending substantially inwardly sufficient to restrain deformation of said core member.

* * * * *